(12) United States Patent
Mikkelsen et al.

(10) Patent No.: US 9,919,445 B2
(45) Date of Patent: Mar. 20, 2018

(54) CUTTING APPARATUS FOR CUTTING FOOD OBJECTS

(71) Applicant: Marel A/S, Aarhus N (DK)

(72) Inventors: Peter Mikkelsen, Svaneke (DK); Tomas Finne Nielsen, Roenne (DK)

(73) Assignee: Marel A/S, Aarhus N (DK)

( * ) Notice: Subject to any disclaimer, the term of this patent is extended or adjusted under 35 U.S.C. 154(b) by 210 days.

(21) Appl. No.: 14/784,423

(22) PCT Filed: Apr. 16, 2014

(86) PCT No.: PCT/DK2014/050103
§ 371 (c)(1),
(2) Date: Oct. 14, 2015

(87) PCT Pub. No.: WO2014/169925
PCT Pub. Date: Oct. 23, 2014

(65) Prior Publication Data
US 2016/0075045 A1    Mar. 17, 2016

(30) Foreign Application Priority Data

Apr. 19, 2013  (DK) ................... 2013 00234

(51) Int. Cl.
*B26D 7/06* (2006.01)
*B26F 3/00* (2006.01)
(Continued)

(52) U.S. Cl.
CPC .......... *B26D 7/0625* (2013.01); *A22C 17/002* (2013.01); *B23K 26/38* (2013.01);
(Continued)

(58) Field of Classification Search
CPC ........ B26D 7/0625; B26D 7/18; B23K 26/38; B23K 2230/30; B23K 2203/50; B26K 26/402; B26F 3/004
(Continued)

(56) References Cited

U.S. PATENT DOCUMENTS

| 4,462,287 A | 7/1984 | Weis et al. |
| 4,962,568 A | 10/1990 | Rudy et al. |

(Continued)

FOREIGN PATENT DOCUMENTS

| GB | 2 377 362 A | 1/2003 |
| WO | 2004034794 A1 | 4/2004 |
| WO | 2014169925 A1 | 10/2014 |

OTHER PUBLICATIONS

International Search Report; International Application No. PCT/DK2014/050103; Date of Actual Completion of International Search: Jun. 24, 2014; International Search Report: dated Feb. 7, 2014.

(Continued)

*Primary Examiner* — Ghassem Alie
(74) *Attorney, Agent, or Firm* — Justin Cassell; Workman Nydegger

(57) ABSTRACT

An apparatus for cutting food objects conveyed from an inlet conveyor to an adjacent outlet conveyor. A moving mechanism is operably connected to the outlet conveyor to provide movement of the inlet end of the outlet conveyor from an adjacent position. The inlet end of the outlet conveyor is moved from a position adjacent to the outlet end of the inlet conveyor to an open position and back to an adjacent position. A cutting device cuts the food objects into portions and trim. A control unit controls the moving mechanism to move the inlet end of the outlet conveyor to an open position when separating trim portions to fall as desired and subsequently instructs the inlet end the outlet conveyor to move (Continued)

back to the adjacent position before the next cutting to provide a support for the remaining parts of the food object.

15 Claims, 5 Drawing Sheets

(51) Int. Cl.
  *B26D 7/18* (2006.01)
  *B23K 26/38* (2014.01)
  *B23K 26/402* (2014.01)
  *A22C 17/00* (2006.01)
  *B23K 103/00* (2006.01)

(52) U.S. Cl.
  CPC .............. *B23K 26/402* (2013.01); *B26D 7/18* (2013.01); *B26F 3/004* (2013.01); *B23K 2203/30* (2015.10); *B23K 2203/50* (2015.10); *B26D 2210/02* (2013.01)

(58) Field of Classification Search
  USPC ............. 83/13, 104, 80, 155, 157, 79, 155.1
  See application file for complete search history.

(56) References Cited

U.S. PATENT DOCUMENTS

| 6,407,818 | B1 | 6/2002 | Whitehouse | |
|---|---|---|---|---|
| 6,607,082 | B2* | 8/2003 | Biagioni | B07C 5/362 198/460.2 |
| 6,640,681 | B1 | 11/2003 | Weber | |
| 2011/0094948 | A1* | 4/2011 | Betti | B26D 7/18 209/620 |
| 2013/0205961 | A1* | 8/2013 | Baechtle | B26D 1/56 83/26 |

OTHER PUBLICATIONS

Danish Search Report; Application No. PA 2013 00234; Date of Completion of Search Report: Nov. 14, 2013.

* cited by examiner

CUTTING APPARATUS FOR CUTTING FOOD OBJECTS

CROSS-REFERENCES TO RELATED APPLICATIONS

This application is the national phase of International Application No. PCT/DK2014/050103 filed on Apr. 16, 2014, which claims the benefit of priority to Danish Patent Application No. PA 2013 00234 filed on Apr. 19, 2013. The entire disclosures thereof are incorporated herein by reference.

FIELD OF THE INVENTION

The present invention relates to a cutting apparatus for cutting food objects while the food objects are conveyed from an inlet conveyor to an outlet conveyor, and to a method of operating such a cutting apparatus.

BACKGROUND OF THE INVENTION

For the mechanical dividing of large pieces of meat into pieces, use is typically made of a so-called portion cutter. A portion cutter is a machine with a number of conveyor belts, a computer vision system, a knife and a control unit. Typically, there are two conveyor belts which are arranged end to end with a relatively small gap between them. The computer vision system can also be called a scanning system. The knife is typically of the "sword" type, i.e. a relatively long knife which is arranged at the side of the gap between the two conveyor belts. When a portion is to be cut from the piece of meat the meat is lying over the gap between the two conveyor belts, and the cut is carried out by the knife being rotated once at high speed, whereby the piece of meat is cut through.

FIG. 1 shows an example of a portion cutter indicated in general by the reference number 1. The items to be cut, for example pieces of meat 10, are transported on an inlet conveyor belt 2 forward to the machine where the piece of meat is first scanned 4, for example by means of laser vision equipment, X-ray equipment, ultrasonic equipment or similar measuring/scanning equipment. On the basis of this scanning, a number of pieces which fulfill certain criteria are determined, and a cutting-up 6 of the piece of meat 10 into portions and possibly trim pieces is carried out. As mentioned, this cutting-up is carried out for example with a rotating knife or the like. The portions may be transported away from the portion cutter in batches 12 by means of a conveyor 8.

The term "portion cutter" describes that the piece of meat is cut-up into portions, and the term "portion" is the term often used for the small pieces of meat. The machine can be used for the cutting of things other than meat, e.g. fish, poultry and cheese etc.

Since portion cutters were developed in the early 90's they have become faster and faster and more and more accurate. Today portion cutters have become more or less the industrial standard, high yield and capacity is obtained and focus is now set on easier handling of the "meat" both before the meat enters portioning cutters, and also after the meat has been processed into portions and trim. This way the integration of portion cutters into complete lines (systems) becomes easier.

As an example, when portioning a salmon filet into portions it is often desired to make a little "trim" in the neck end and at the "tail" end. The reason is that the portions then will appear more uniform. In this case the salmon fillet will be divided into two different products: the "portions" and the "trim". It is clear that it would be desirable to separate these two products in two flows for easier packing etc. Today this is done either manually or by some kind of a mechanical separation. The mechanical separation today is done after the actual portion cutters. Mechanical separator can as an example be rejections arms, drop conveyors, air nozzles etc.

The problem is that especially small trim (desired because of the high yield) tends to move in the cutting process and therefore it can be very difficult to separate it from the portions by a mechanical separator since the trim can move very close to a portion. Another problem is that before separating the trim from the portions in two flows it needs to be pre-separated lengthwise in the portion cutters. This is often done by letting the outlet belt run faster than the inlet belt. The disadvantage by doing this is that either the capacity suffers or the accuracy will suffer since the salmon fillet is stretched because it is supported by to belts with different speed. Another possibility is to have a mechanical device to make this separation but that would add cost and require more floor space.

The inventor of the present invention has appreciated that there is thus a need for an apparatus where the handling of the portions and trim is simplified and that has a higher capacity and has in consequence devised the present invention.

SUMMARY OF THE INVENTION

It would be advantageous to achieve a cutting apparatus that is capable of the separating of trim from portions at essentially the same time as the cutting is performed. In general, the invention preferably seeks to mitigate, alleviate or eliminate one or more of the above mentioned disadvantages singly or in any combination. In particular, it may be seen as an object of the present invention to provide a cutting apparatus that solves the above mentioned problems, or other problems, of the prior art.

To better address one or more of these concerns, in a first aspect of the invention a cutting apparatus is provided for cutting food objects while the food objects are conveyed from an inlet conveyor to an outlet conveyor, the cutting apparatus comprising:

a moving mechanism operable connected to the outlet conveyor for providing movement of the inlet end of the outlet conveyor from an adjacent position, where the inlet end of the outlet conveyor is adjacent to the outlet end of the inlet conveyor, to an open position where the inlet end of the outlet conveyor is moved away from the outlet end of the inlet conveyor, and vice versa, from an open position back to the adjacent position, a cutting device for cutting the food objects, where the cutting includes cutting trim portions from the remaining part of the food objects, a control unit for controlling the moving mechanism, the controlling including instructing the moving mechanism to move the inlet end of the outlet conveyor to an open position when separating the cut trim portions from the remaining part of the food objects such that the cut trim portions fall down between the inlet end of the outlet conveyor and the outlet end of the inlet conveyor, and subsequently instructing the moving mechanism to move the inlet end of the outlet conveyor back to the to the adjacent position at a speed such that the inlet end of the outlet conveyor reaches the adjacent position before the next cutting such that it provides a support for the remaining part of the food object.

Accordingly, a cutting apparatus is provided where the separation of the cut trim from the remaining part of the food objects is obtained essentially the same time as the cutting, i.e. only fraction of seconds pass from the cutting until the cut trim is separated from the remaining part of the food objects. Thus, there is no longer need for separating the cut trim from the remaining part of the food objects via manual labor or mechanical separator such as rejections arms, drop conveyors, air nozzles and the like. The throughput of the cutting apparatus is thus increased significantly and the cutting apparatus becomes thus more economical. Moreover, such mechanical separators can be space demanding and thus no extra floor space is required.

Also, in prior art cutting apparatus the cut food object must be pre-separated lengthwise by e.g. letting the outlet conveyor run faster than the inlet conveyor, but this reduces the capacity of the processing because the inlet conveyor must run slower than the outlet conveyor. This may easily be reflected in the accuracy of the cutting because the food object must be supported by two conveyors with different speed.

As specified in the claims, the cutting apparatus and the method of operating the cutting apparatus is used for food objects in general. In the description reference is made to particular examples of food objects such as fishes, meat, etc., but it will be understood that the apparatus can be used for cutting of a wide variety and type of food objects other than meat and fishes, e.g. poultry, cheese, etc.

In one embodiment, the cutting device is positioned such that the cutting plane of the cutting device intersects an intermediate space formed between the outlet end of the inlet conveyor and the inlet end of the outlet conveyor when being in the adjacent position.

In one embodiment, the trim portions include a front trim portion and where, when cutting a front trim portion of an incoming food object the control unit instructs the moving mechanism to move the inlet end of the outlet conveyor to an open position prior to cutting, instructs the cutting device to cut the front trim portion when the front trim portion extends over the outlet end of the inlet conveyor, and subsequently instructs the moving mechanism to move the inlet end of the outlet conveyor back to the adjacent position at a speed such that the inlet end of the outlet conveyor reaches the adjacent position before the remaining part of the food object falls down in the gap between and/or next the cut is made.

In another embodiment, the trim portions include a front trim portion and where when cutting a front trim portion of an incoming food object the control unit instructs the moving mechanism to be in the adjacent position until the front trim portion of the incoming food object has at least partly passed the outlet end of the inlet conveyor, instructs the cutting mechanism to cut the front trim portion when it extends over the inlet end of the outlet conveyor, instructs the moving mechanism to move the inlet end of the outlet conveyor to an open position such that the cut front trim portion falls down between the inlet end of the outlet conveyor and the outlet end of the inlet conveyor, and subsequently instructs the moving mechanism to move the inlet end of the outlet conveyor back to the adjacent position.

Accordingly, two alternatives are provided for cutting and separating the front trim portions from the remaining part of the food objects in a simple manner and almost simultaneously to the cutting process.

In one embodiment, the controlling further includes instructing the moving mechanism to keep the inlet end of the outlet conveyor at the adjacent position while instructing the cutting device to cut at least some of the remaining part of the food object according to a pre-defined cutting criterion while the food object is conveyed from the inlet conveyor to the outlet conveyor. This pre-defined cutting criteria may e.g. include cutting the food object into portions of e.g. the same weight and/or the same thickness based on e.g. image data acquired by an image device such as a scanning device, e.g. laser vision equipment, X-ray equipment, ultrasonic equipment or similar measuring/scanning equipment.

In one embodiment, the pre-defined cutting criterion includes cutting at least a part of the food object into portions. The term portions means smaller food objects originating from said food object, i.e. "slices" that have fixed dimensional size such as length and/or volume and/or fixed weight. The food object may e.g. be, but not limited to, any type of meat, fish, poultry, cheese etc., and the portion can e.g. be 150 g steak, or 100 g fish, or 5 cm thick meat or fish slices etc.

In one embodiment, the pre-defined cutting criterion includes cutting a rear trim portion of the food object, where the controlling further includes, subsequent to cutting the rear trim portion, instructing the moving mechanism to move the inlet end of the outlet conveyor from the adjacent position to an open position essentially up to the backmost part of the cut food object such that the cut rear trim portion falls down between the inlet end of the outlet conveyor and the outlet end of the inlet conveyor and subsequently to move the outlet end of the inlet conveyor back to the adjacent position.

In one embodiment, when a food object enters the inlet end of the outlet conveyor being in the adjacent position, the control unit instructs the moving mechanism to move the inlet end of the outlet conveyor away from the outlet end of the inlet conveyor at such a speed that the inlet end of the outlet conveyor provides support for the front end of the food object, this being done with the front end of the food object resting on the inlet end of the outlet conveyor; and wherein, after cutting the trim portion from the front end of the food object, the control unit instructs the moving mechanism to move the inlet end of the outlet conveyor back to the adjacent position. By providing such a support, the front end of the food object is hanging less down over the outlet end of the inlet conveyor when the cutting is performed, done to reduce an effect of an askew first cut of the first portion of the food object. In this connection it is further noted that after cutting, the inlet end of the outlet conveyor is moved rapidly away from the outlet end of the inlet conveyor, such that it is ensured that the cut off part is falling down.

In one embodiment, the moving mechanism is further operable connected to the inlet conveyor for providing movement of the outlet end of the inlet conveyor. In that way, the outlet end of the inlet conveyor, or the inlet end of the outlet conveyor, or both, may be moved back and forth. This may e.g. be of an advantage where traveling distance of the outlet end of the inlet conveyor is less than that of the inlet end of the outlet conveyor when generating the distance necessary to release the cut trim portions between the inlet end of the outlet conveyor and the outlet end of the inlet conveyor.

In one embodiment, the pre-defined cutting criterion includes cutting a rear trim portion of the food object, where the controlling further includes, subsequent to cutting the rear trim portion, instructing the moving mechanism to move the outlet end of the inlet conveyor from the adjacent position to an open position such that the rear trim portion falls down between the inlet end of the outlet conveyor and the outlet end of the inlet conveyor and subsequently to move the outlet end of the inlet conveyor back to the adjacent position. This is e.g. of a particular advantage when cutting the rear trim portion because this may simplify the operation of releasing the rear trim portion through the opening between the inlet and outlet conveyors. Also, the time until the rear trim portion is dropped down between the inlet end of the outlet conveyor and the outlet end of the inlet conveyor is reduced because the outlet end of the inlet conveyor is moving in the opposite to the conveying direction.

In one embodiment, the cutting apparatus further comprises a take-away conveyor situated below the inlet conveyor and the outlet conveyor for at least partly receiving the cut trim portions falling down between the inlet end of the outlet conveyor and the outlet end of the inlet conveyor.

In one embodiment, the trim portions include portions between head and tail ends of incoming food objects. This may e.g. be the case where a bone or e.g. any undesired tissue or any means is to be removed, but by cutting oppositely to this "intermediate" trim portion it may easily be released between the inlet end of the outlet conveyor and the outlet end of the inlet conveyor, by e.g. moving the inlet end of the outlet conveyor from the adjacent position to the open position so that it falls down there between. Thus, the cutting apparatus is not only capable of cutting and removing end trim portions but also all trim portions located there between in the food object.

In one embodiment, moving of the inlet end of the outlet conveyor from the open position back to the adjacent position may be done such that upon reaching the adjacent position it is positioned below the surface level of the conveyor inlet conveyor towards the floor/supporting surface, where it is subsequently moved upwards to the same surface level as of the inlet conveyor. This is to prevent that the food object become clamped between the two conveyors, as the remaining part of the food object may up to some extent bend down from the outlet end of the inlet conveyor. Accordingly, this end is "picked-up" by the inlet end of the outlet conveyor and lifted up to the same height/plane as the inlet conveyor.

In one embodiment, the cutting device is selected from:
a water jet cutting device,
a cutting blade,
a laser cutting device,
an ultrasonic cutting device,
a string/wire cutting device,
saw means,
vibrating knife means, and
scissor means.

The knife may also be of the "sword" type, i.e. a relatively long knife which is arranged at the side of the gap between the inlet conveyor and the outlet conveyor so that it intersects the intermediate space formed between the outlet end of the inlet conveyor and the inlet end of the outlet conveyor when being in the adjacent position. Accordingly, when a portion is to be cut from the food object, this may take place when the food object is lying over the gap between the two conveyors, and the cut is carried out by the knife being rotated once at high speed, whereby the piece of meat is cut through.

In one embodiment, the moving mechanism may comprise pneumatic drive means, electrical actuator means and/or electrical motor means.

According to a further aspect of the invention a method is provided for operating a cutting apparatus for cutting food objects while the food objects are conveyed from an inlet conveyor to an outlet conveyor.

In the claims and the description reference is made to trim portions that are being separated or rejected. e.g. front trim portions, rear trim portions, intermediate trim portions, etc. It should be understood, however, that in connection with the present invention "trim" and "trim portions" can be any part that is rejected from the main conveyor path and that it may even be the main food product or food object.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
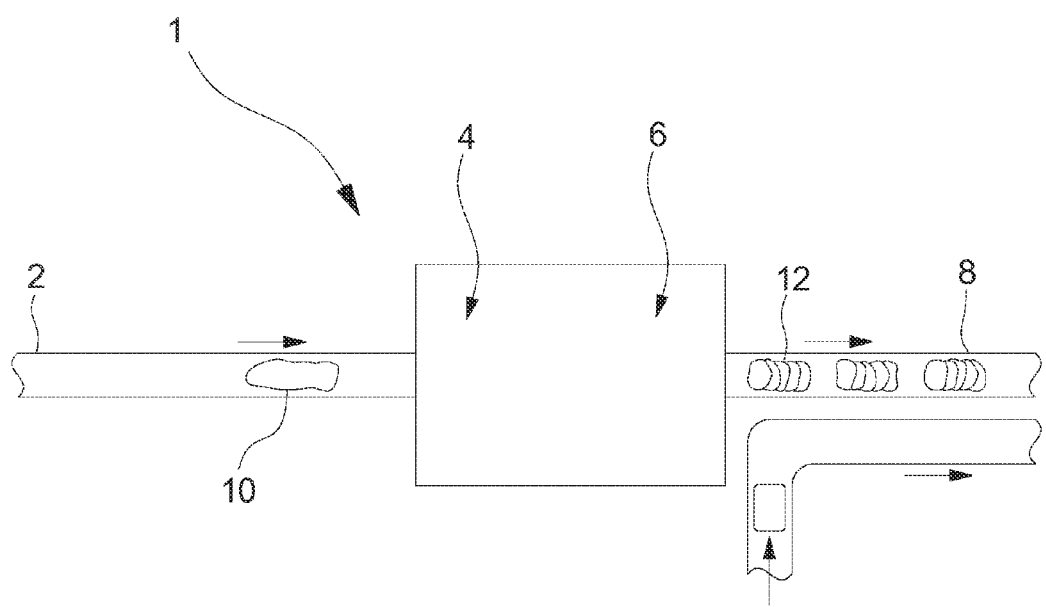
FIG. 1 shows an example of a prior art portion cutter,
FIGS. 2a-f graphically show an embodiment of a cutting apparatus according to the present invention for cutting food objects while the food objects are conveyed.
Figure 2A:
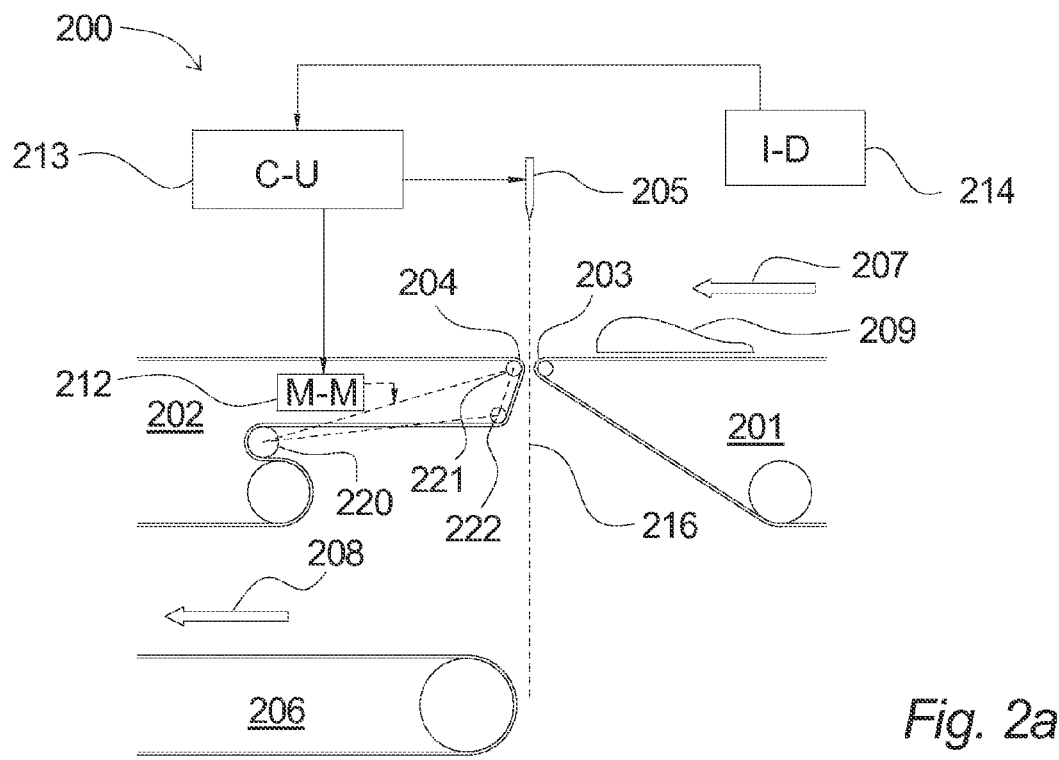
Figure 2B:
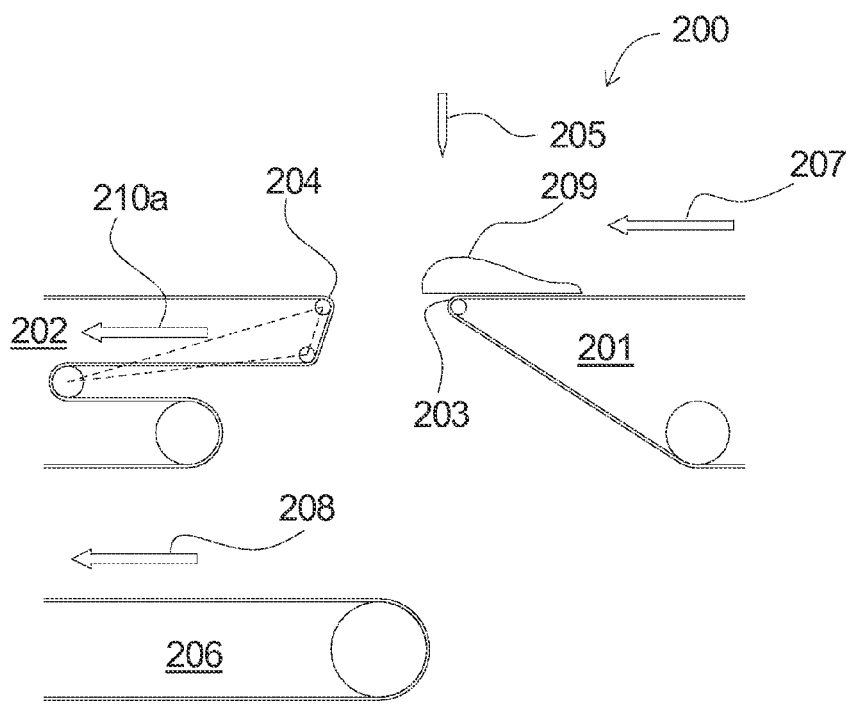

FIGS. 2a-f depict graphically an embodiment of a cutting apparatus 200 according to the present invention for cutting food objects 209 while the food objects are conveyed in a direction indicated by the arrow 207 from an inlet conveyor 201 to an outlet conveyor 202. The cutting apparatus 200 comprises a cutting device 205, a moving mechanism (M-M) 212 operable connected to the outlet conveyor 202 for providing movement of the inlet end 204 of the outlet conveyor from an adjacent position as shown in FIG. 2a, where the inlet end of the outlet conveyor is adjacent to the outlet end 203 of the inlet conveyor 201, to an open position as shown in FIG. 2b, where the inlet end 204 of the outlet conveyor 202 is moved away from the outlet end 203 of the inlet conveyor 201, and vice versa, from the open position shown in FIG. 2b back to the adjacent position shown in FIG. 2a.

The cutting apparatus 200 further comprises a control unit (C-U) 213 for controlling the moving mechanism (M-M) 212. This control unit may also control other parts such as e.g. the cutting device 205. The data utilized by the control unit (C-U) 213 as input data for the controlling may be data originating from an image device (I-D) 214 that is capable of detecting any kind of the image data such, but not limited to, data relating to the height and/or the width and/or color differences of all the incoming food objects. These data may e.g. be used for generating e.g. a 2 or 3-dimension profile of the food objects and/or the volume and/or distribution of the incoming food objects. The data originating from the image device (I-D) 214, e.g. including side views (obtained by multiple cameras or via mirrors) and the color differences, may also be utilized to detect the trim portions that are to be cut from the remaining part of the food objects, and/or also to detect the location of any undesired means such as tissues, bones, metal fractions and the like.

The image device (I-D) 214 may either be positioned above the inlet conveyor or below it, or both, and may be selected from, but is not limited to, a digital camera, laser vision equipment, X-ray equipment, ultrasonic equipment or similar measuring/scanning equipment.

The position of the incoming food objects may be tracked at all times so that the exact location of the food objects is known, e.g. via tachometer and similar means.

The controlling of the control unit (C-U) 213 includes instructing the moving mechanism (M-M) 212 to move the inlet end 204 of the outlet conveyor 202 to an open position when separating the trim portions that have been cut from the food objects such that they fall down between the inlet end 204 of the outlet conveyor and the outlet end 203 of the inlet conveyor 201, and subsequently instructing the moving mechanism to move the inlet end of the outlet conveyor back to the adjacent position.

The moving mechanism (M-M) 212 may as indicated in FIG. 2a involve three rollers 220, 221 and 222 of the outlet conveyor 202, which three rollers 220, 221 and 222 are supported by a common frame (indicated by dash lines) and can be moved back and forth as illustrated in FIGS. 2b-2f.

The cutting device 205 is preferably positioned such that the cutting plane 216, as indicated by the dotted line 216, intersects the intermediate space formed between the outlet end 203 of the inlet conveyor 201 and the inlet end 204 of the outlet conveyor 202 when being in the adjacent position. The cutting device may be, but is not limited to, any type of a cutter, such as a rotating cutting blade, a water jet cutting device, laser cutting device, ultrasonic cutting device, string/wire cutting device, saw means, or any type of cutting blade means.

A take-away conveyor 206 is situated below the inlet conveyor 201 and the outlet conveyor 202 for receiving the trim portions falling down between the inlet end of the outlet conveyor and the outlet end of the inlet conveyor and conveys the trim portions for example in a direction indicated by the arrow 208.

FIGS. 2a-f depict schematically one embodiment of operating the cutting apparatus including removing trim portions 211, 218 from the remaining part of the food objects 209.

As an example in this embodiment, the food object may be a salmon fillet and the trim portions are the neck end and the tail end of the salmon fillet (or any type of fish fillet).

FIG. 2b illustrates the step where the control unit (C-U) 213 instructs the moving mechanism (M-M) 212 to move the inlet end 204 of the outlet conveyor 202 away from the adjacent position shown in FIG. 2a to an open position as indicated by the arrow 210a.

Figure 2C:
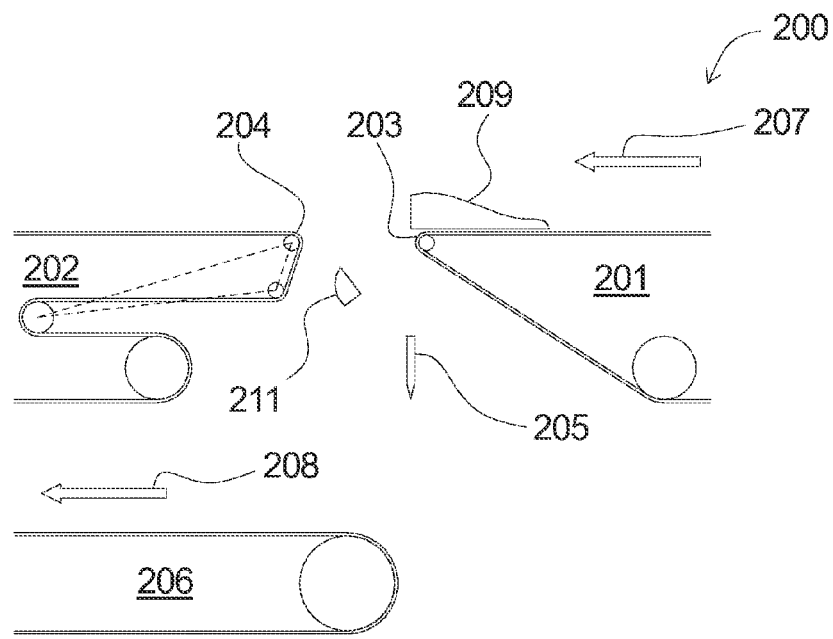

FIG. 2c illustrates the step where the control unit (C-U) 213 instructs the cutting device 205 to cut through the front trim part of the food object resulting in that the front trim portion 211 of the food object 209 falls down between the inlet and the outlet ends 203, 204 of the conveyors 201, 202 onto the underlying take-away conveyor 206.

Figure 2D:
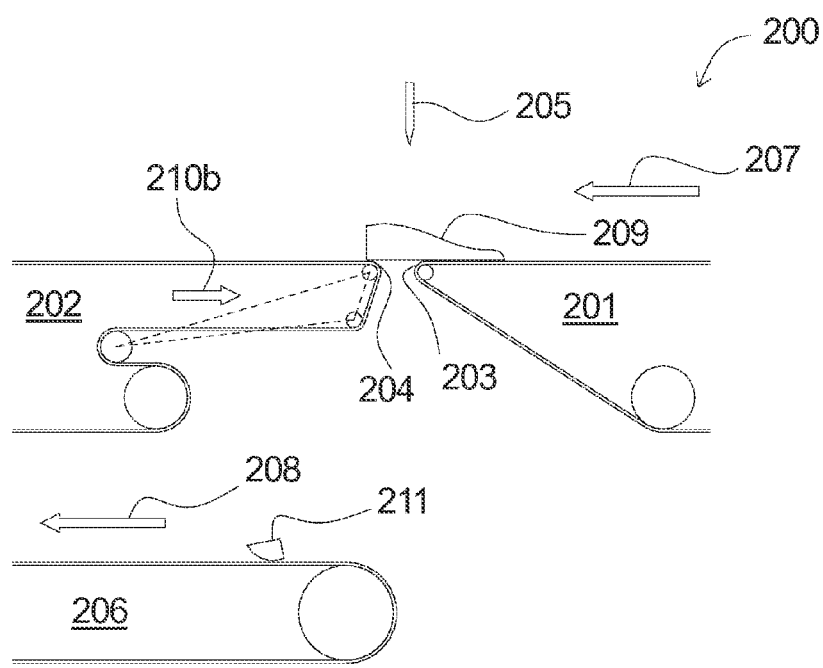

FIG. 2d shows where the control unit (C-U) 213 instructs the moving mechanism (M-M) 212 to move the inlet end 204 of the outlet conveyor 202 back towards the outlet end 203 of the inlet conveyor 201 as indicated by the arrow 210b to the initial adjacent position at a speed such that upon reaching the adjacent position the inlet end 204 provides a support for the food item 209, before it falls down in the gap and/or the next cut is made. As shown here, the front trim portion 211 is subsequently conveyed in the direction indicated by the arrow 208 by the take-away conveyor 206.

The time from where the inlet end 204 of the outlet conveyor 202 moves from the adjacent position shown in FIG. 2a, to the open position shown in FIG. 2b and back to the adjacent position shown in FIG. 2b may take only a fraction of a second.

Figure 2E:
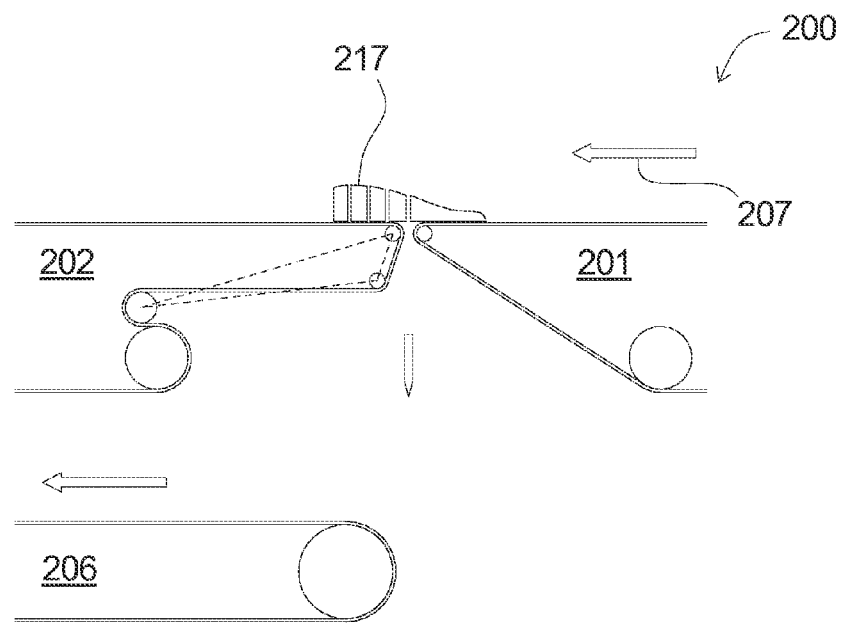

FIG. 2e illustrates the step where the control unit (C-U) 213 instructs the cutting device 205 to cut the food object into fixed portions 217, e.g. portions of fixed weight and/or fixed geometrical size such as length.

Figure 2F:
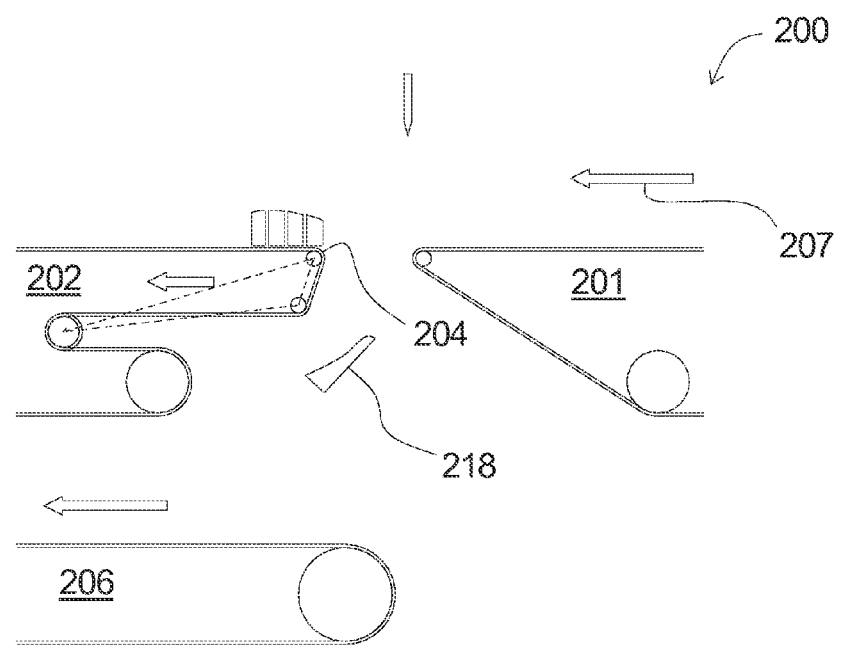

FIG. 2f illustrates the step where the rear trim portion, e.g. the tail part of the salmon/fish fillet, is removed by means of instructing the moving mechanism (M-M) 212 to move the inlet end 204 of the outlet conveyor 202 up to the backmost part of the cut food object such that the rear trim portion 218 falls down between the inlet end of the outlet conveyor and the outlet end of the inlet conveyor onto the take-away conveyor 206.

The releasing of the rear trim portion may in another embodiment (not shown here) also be achieved by means of providing an moving mechanism at the inlet conveyor so as to move the outlet end 203 of the inlet conveyor 201 away from the inlet end 204 of the outlet conveyor 202.

It should be noted that the present invention should not be construed as being limited to the embodiment shown in FIGS. 2a-f. As an example, the step of moving the inlet end 204 of the outlet conveyor 202 to the open position as shown in FIG. 2b may be performed after the front trim part has been cut from the remaining part of the food object 209, i.e. the cutting is performed when the inlet and outlet ends 203, 204 are in adjacent position as shown in FIG. 2a, where the inlet end 204 of the outlet conveyor 202 supports the front trim portion during cutting and subsequently moves quickly to the open position such that the front trim portion falls down between the inlet and outlet ends.

Also, the trim portions discussed in relation to FIG. 2 should not be construed as being limited to only front trim and/or rear trim portions, but a trim portion could just as well be positioned there between, e.g. a bone part, where the trim portion would be a cut at the opposite side to this bone part. The trim portion may e.g. be detected by an imaging device such as an X-ray machine.

The separation of the "intermediate" trim portion might be done e.g. similarly as discussed in relation to FIG. 2a,b, or as discussed above, by means of moving the inlet end of the outlet conveyor to the open position after the "intermediate" trim portion has been cut from the remaining part of the food object 209.

Figure 3:
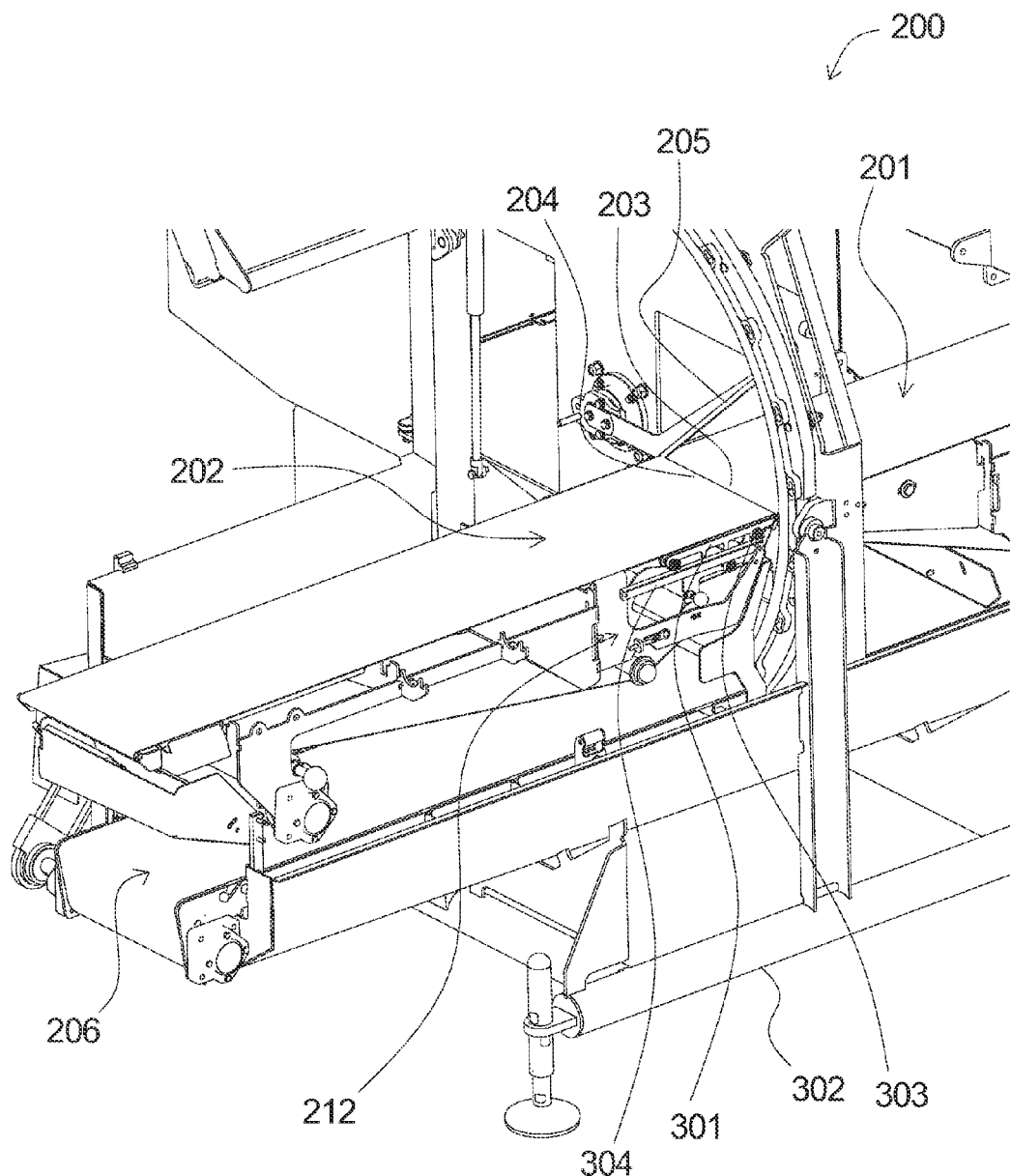
FIG. 3 shows a schematic drawing of the apparatus discussed in relation to FIG. 2.

FIG. 3 shows a schematic drawing of the apparatus discussed in relation to FIG. 2, showing the among other things a frame structure 302, the inlet conveyor 201, the outlet conveyor 202, the outlet end 203 of the inlet conveyor, the inlet end 204 of the outlet conveyor, the cutting device 205 which in this case may be a knife of the "sword" type, the take-away conveyor 206 arranged below the inlet and outlet conveyors and the moving mechanism 212.

The moving mechanism may comprise any means for allowing the back and forth movement of the inlet end 204 of the outlet conveyor 202, such as a carrier 301 comprising wheels 303 that are slideable mounted to parallel arranged sliding rails 304. Moreover, the outlet conveyor is provided with a belt stretching mechanism well known in the art for maintaining substantial constant tension in the belt at all times.

The operation of the inlet and outlet conveyors, the cutting device and the moving mechanism may be operated by a control unit such as an industrial computer that is pre-programmed to carry out all the steps discussed in relation to FIGS. 2-3.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A method of operating a cutting apparatus for cutting food objects while the food objects are conveyed from an inlet conveyor to an outlet conveyor, the method comprising:

providing movement of an inlet end of the outlet conveyor from an adjacent position, wherein the inlet end of the outlet conveyor is adjacent to an outlet end of the inlet conveyor, to an open position, wherein the inlet end of the outlet conveyor is moved away from the outlet end of the inlet conveyor, and vice versa, from an open position back to the adjacent position, cutting the food objects, wherein the cutting includes cutting trim portions from the remaining parts of the food objects, wherein the food objections are cut by a cutting device that is positioned such that the cutting plane of the cutting device intersects an intermediate space formed between the outlet end of the inlet conveyor and the inlet end of the outlet conveyor when being in the adjacent position, and controlling a moving mechanism, the controlling of the moving mechanism including moving the inlet end of the outlet conveyor to an open position, the cutting of the trim portions being performed by the cutting device while the inlet end of the outlet conveyor is in the open position such that the cut trim portions are allowed to separate from the remaining part of the food objects at essentially the same time as the cutting of the trim portions is performed such that the cut trim portions fall down between the inlet end of the outlet conveyor and the outlet end of the inlet conveyor, and subsequently moving the inlet end of the outlet conveyor back to the adjacent position at a speed such that the inlet end of the outlet conveyor reaches the adjacent position before the next cutting such that the inlet end of the outlet conveyor provides a support for the remaining part of the food object.

2. A computer program product comprising computer readable instructions for carrying out the steps of the method according to claim 1, wherein the computer program product is executed on a suitable computer device.

3. A cutting apparatus for cutting food objects while the food objects are conveyed from an inlet conveyor to an outlet conveyor, the cutting apparatus comprising:

a moving mechanism operably connected to the outlet conveyor to provide providing movement of the inlet end of the outlet conveyor from an adjacent position, wherein the inlet end of the outlet conveyor is adjacent to the outlet end of the inlet conveyor to an open position wherein the inlet end of the outlet conveyor is moved away from the outlet end of the inlet conveyor, and vice versa, from an open position back to the adjacent position, a cutting device for cutting the food objects, wherein the cutting includes cutting trim portions from the remaining parts of the food objects, and a control unit for controlling the moving mechanism, wherein the cutting device is positioned such that the cutting plane of the cutting device intersects an intermediate space formed between the outlet end of the inlet conveyor and the inlet end of the outlet conveyor when being in the adjacent position, and wherein the control unit controls the moving mechanism by instructing the moving mechanism to move the inlet end of the outlet conveyor to an open position, the cutting of the trim portions being performed by the cutting device while the inlet end of the outlet conveyor is in the open position such that the cut trim portions are allowed to separate from the remaining parts of the food objects at essentially the same time as the cutting of the trim portions is performed such that the cut trim portions fall down between the inlet end of the outlet conveyor and the outlet end of the inlet conveyor, and subsequently instructing the moving mechanism to move the inlet end of the outlet conveyor back to the adjacent position at a speed such that the inlet end of the outlet conveyor reaches the adjacent position before the next cutting such that the inlet end of the outlet conveyor provides a support for the remaining part of the food object.

4. A cutting apparatus according to claim 3, wherein the trim portions include a front trim portion, and wherein, when cutting a front trim portion of an incoming food object, the control unit instructs the moving mechanism to move the inlet end of the outlet conveyor to an open position prior to cutting, instructs the cutting device to cut the front trim portion when the front trim portion extends over the outlet end of the inlet conveyor, and subsequently instructs the moving mechanism to move the inlet end of the outlet conveyor back to the adjacent position.

5. A cutting apparatus according to claim 3, wherein the trim portions include a front trim portion, and wherein, when cutting a front trim portion of an incoming food object, the control unit instructs the moving mechanism to be in the adjacent position until the front trim portion of the incoming food object has at least partly passed the outlet end of the inlet conveyor, instructs the cutting mechanism to cut the front trim portion when the front trim portion extends over the inlet end of the outlet conveyor, instructs the moving mechanism to move the inlet end of the outlet conveyor to an open position such that the cut front trim portion falls down between the inlet end of the outlet conveyor and the outlet end of the inlet conveyor, and subsequently instructs the moving mechanism to move the inlet end of the outlet conveyor back to the adjacent position.

6. A cutting apparatus according to claim 3, wherein the controlling further includes instructing the moving mechanism to keep the inlet end of the outlet conveyor at the adjacent position while instructing the cutting device to cut at least some of the remaining parts of the food object according to a pre-defined cutting criterion while the food object is conveyed from the inlet conveyor to the outlet conveyor.

7. A cutting apparatus according to claim 6, wherein the pre-defined cutting criterion includes cutting at least a part of the food object into portions.

8. A cutting apparatus according to claim 6, wherein the pre-defined cutting criterion includes cutting a rear trim portion of the food object,
wherein the controlling further includes, subsequent to cutting the rear trim portion, instructing the moving mechanism to move the inlet end of the outlet conveyor from the adjacent position to an open position up to the backmost part of the cut food object such that the cut rear trim portion falls down between the inlet end of the outlet conveyor and the outlet end of the inlet conveyor and to subsequently move the outlet end of the inlet conveyor back to the adjacent position.

9. A cutting apparatus according to claim 6, wherein the moving mechanism is further operably connected to the inlet conveyor to provide movement of the outlet end of the inlet conveyor, and
wherein the pre-defined cutting criterion includes cutting a rear trim portion of the food object, wherein the controlling further includes, subsequent to cutting the rear trim portion, instructing the moving mechanism to move the outlet end of the inlet conveyor from the adjacent position to an open position until the cut rear trim portion falls down between the inlet end of the outlet conveyor and the outlet end of the inlet conveyor and to subsequently move the outlet end of the inlet conveyor back to the adjacent position.

10. A cutting apparatus according to claim 3, wherein, when a food object enters the inlet end of the outlet conveyor being in the adjacent position, the control unit instructs the moving mechanism to move the inlet end of the outlet conveyor away from the outlet end of the inlet conveyor at such a speed that the inlet end of the outlet conveyor provides support for a front end of the food object with the front end of the food object resting on the inlet end of the outlet conveyor; and
wherein, after cutting the trim portion from the front end of the food object, the control unit instructs the moving mechanism to move the inlet end of the outlet conveyor back to the adjacent position.

11. A cutting apparatus according to claim 3, wherein the moving mechanism is further operably connected to the inlet conveyor to provide movement of the outlet end of the inlet conveyor.

12. A cutting apparatus according to claim 3, further comprising a take-away conveyor situated below the inlet conveyor and the outlet conveyor for at least partly receiving the cut trim portions falling down between the inlet end of the outlet conveyor and the outlet end of the inlet conveyor.

13. A cutting apparatus according to claim 3, wherein the trim portions include portions between head and tail ends of incoming food objects.

14. A cutting apparatus according to claim 3, wherein the cutting device includes
a water jet cutting device,
a cutting blade,
a laser cutting device,
an ultrasonic cutting device,
a string/wire cutting device,
saw means,
vibrating knife means, or
scissor means.

15. A cutting apparatus according to claim 3, wherein the moving mechanism comprises pneumatic drive means, electrical actuator means and/or electrical motor means.

* * * * *